Patented June 30, 1953

2,643,970

UNITED STATES PATENT OFFICE 2,643,970

PROCESS FOR PRODUCTION OF 17α-HYDROXYCORTICOSTERONE BY TISSUE OXIDATION OF 17α HYDROXYPROGESTERONE

Alejandro Zaffaroni, Rochester, N. Y., assignor to Syntex S. A., Mexico City, Mexico, a corporation of Mexico No Drawing. Application July 6, 1951,
Serial No. 235,559

4 Claims. (Cl. 195—51)

The present invention relates to a novel process for the production of cyclopentanoperhydrophenanthrene compound.

More particularly the present invention relates to a novel process for the preparation of 17α-hydroxycorticosterone from 17α-hydroxyprogesterone.

In co-pending application Serial No. 235,558, filed July 5, 1951, a novel process is diclosed for the preparation of the adrenal hormones corticosterone and 17α-hydroxycorticosterone from the corresponding 11-desoxycorticosterone compounds by in vitro incubation of the starting compounds with animal adrenal gland material, such as beef or hog adrenals. In accordance with the disclosure of this co-pending application good yields of corticosterone and 17α-hydroxycorticosterone were effected when the starting materials were incubated with fresh, finely divided animal adrenal tissue in physiological saline solution in the presence of a buffer and especially in the presence of an alkali metal.

In accordance with the present invention the surprising discovery has been made, however, that 17α-hydroxycorticosterone may be prepared from 17α-hydroxyprogesterone by in vitro incubation of the starting compound with animal adrenal gland material, such as beef or hog adrenals. In other words, it has been discovered in accordance with the present invention that adrenal gland tissue is capable of introducing into 17α-hydroxyprogesterone both an oxygen function at C–11 and an oxygen function at C–21. Preferably the adrenal gland material is in finely divided form, as for example in the form of homogenates, bries or slices and the reaction, i. e. incubation, takes place under certain specific conditions as hereinafter set forth. The reaction according to the present invention is indicated by the following equation:

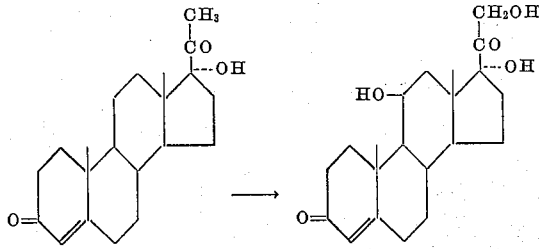

In carrying out the process of the present invention, fresh animal adrenal glands, which may be used immediately after slaughtering or kept in a container surrounded by ice-salt mixture for periods not longer than twelve hours, may be ground in a meat grinder or suspended in a buffer solution to be hereinafter described in detail and homogenized as with a Waring blender. The finely divided adrenal gland tissue is mixed with a buffer solution which is capable of maintaining a pH of from 6.8 to 7.8, these buffer solutions being of a well-known type, such as phosphate, carbonate, veronal or borate buffers. The buffer solution utilized is made up by adding sufficient buffer salt solution to a physiological saline solution which may also contain, in addition to the sodium chloride of the saline solution, small amounts of potassium and magnesium ions. Further, the buffer solution should also contain as a reaction promoting agent an alkali metal salt of fumaric or citric acid, as for example potassium or sodium fumarate or citrate. The fumarate or citrate salt is preferably present in the buffer solution in an amount equivalent to at least two and one-half mols of the salt to two hundred parts by weight or grams of the buffer solution, although larger amounts may be utilized. The homogeneous mixture, either by stirring or homogenizing of the finely divided adrenal gland material, should preferably contain one part of tissue to three parts of solution, although it is within the scope of the present invention to utilize from one part of solution to five parts of solution to each part of tissue. The aqueous solution is preferably at a temperature of 37° C. when the mixture with the adrenal tissue is made. This temperature is also preferably maintained during the subsequent incubation which is carried for a period of the order of two hours. Longer periods may also be utilized and the reaction appears to be substantially complete at the end of one hour and at least partially complete at the end of shorter periods, as for example one-half hour. The starting compound 17α-hydroxyprogesterone can be added to the aqueous mixture in solution in a suitable solvent, preferably propylene glycol, this solution being also maintained at the same temperature as the incubation medium, i. e preferably 37° C. The hormone is in relatively dilute solution in the propylene glycol, as for example one part of the hormone to thirty parts of propylene glycol, although larger or smaller amounts may be used. Preferably, an amount of incubation medium is utilized so that for each part of the hormone there is a large amount of tissue, as for example one part of steroid to a thousand parts of tissue. During the entire period of incubation the mixture hereinbefore set forth is subjected to agitation.

Although the preferable temperature for incubation, as previously indicated is 37° C. the incubation takes place quite readily at temperatures just above room temperature, as for example 25° C. and in general temperatures between 5 and 45° C. may be utilized. When the reaction is complete, the reaction mixture may then be extracted with a suitable organic solvent, such as chloroform and chromatographic separation is then preferably utilized for the separation of the 17α-hydroxycorticosterone. In the alternative, other methods of separation, such as dialysis, may be utilized.

The following specific example serves to illustrate but is not intended to limit the present invention:

Example

A physiological saline solution containing potassium and magnesium ions is prepared by combining the following:

40 ml. of 4.5% sodium chloride
1.6 ml. of 5.75% potassium chloride
0.5 ml. of 19.1 MgSO$_4$.7H$_2$O
158 cc. of water A buffer solution is then prepared by combining 160 ml. of the above physiological saline solution, 20 ml. of 0.15 M sodium fumarate and 20 ml. of 0.1 M phosphate buffer having a pH of 7.4. To the above buffer solution there is added a quantity of suprarenal gland from freshly slaughtered pork, beef or sheep in the ratio of one part by volume of tissue to three parts of the above buffer solution, approximately 2 g. of suprarenal gland being utilized. The tissue and buffer solution is then homogenized in a Waring blender and thereafter to the homogenate is added 2 mg. of 17α-hydroxyprogesterone dissolved in propylene glycol, 0.2 ml. of a solution having a concentration of 10 mg. of steroid per ml. of glycol being used. The homogenate and steroid are then incubated at 37° C. in a constant-temperature water bath for a period of three hours, continuous lateral agitation being maintained. At the end of this time the reaction mixture is extracted with chloroform and the extract is then subjected to chromatographic separation. 17α-hydroxycorticosterone is obtained in a yield of better than 50%.

I claim:

1. A process for the production of 17α-hydroxycorticosterone comprising dissolving the corresponding 17α-hydroxyprogesterone in propylene glycol, adding the solution of 17α-hydroxyprogesterone to an incubation mixture of fresh, finely divided animal adrenal tissue in a physiological saline solution containing potassium and magnesium ions and a buffer capable of maintaining a pH of from 6.8 to 7.8 and a salt selected from the class consisting of alkali metal fumarates and citrates, and incubating under agitation at a temperature of between 5 and 45° C. for at least one-half hour, the adrenal tissue being present in an amount equal to from one part of tissue to 1 to 5 parts by volume of buffer solution, the 17α-hydroxyprogesterone being present in an amount approximately equal to one part of compound to 1000 parts of tissue, and the alkali metal salt being present in an amount equal to at least 2½ mols to each 200 parts by weight of the buffer solution.

2. A process for the production of 17α-hydroxycorticosterone comprising dissolving the corresponding 17α-hydroxyprogesterone in propylene glycol, adding the solution of 17α-hydroxyprogesterone to an incubation mixture of fresh, finely divided animal adrenal tissue in a physiological saline solution containing potassium and magnesium ions and a buffer capable of maintaining a pH of from 6.8 to 7.8 and a salt selected from the class consisting of alkali metal fumarates and citrates, and incubating under agitation at a temperature of approximately 37° C. for at least one-half hour, the adrenal tissue being present in an amount equal to from one part of tissue to 1 to 5 parts by volume of buffer solution, the 17α-hydroxyprogesterone being present in an amount approximately equal to one part of compound to 1000 parts of tissue, and the alkali metal salt being present in an amount equal to at least 2½ mols to each 200 parts by weight of the buffer solution.

3. A process for the production of 17α-hydroxycorticosterone comprising dissolving the corresponding 17α-hydroxyprogesterone in propylene glycol, adding the solution of 17α-hydroxyprogesterone to an incubation mixture of fresh, finely divided animal adrenal tissue in a physiological saline solution contain potassium and magnesium ions and a buffer capable of maintaining a pH of from 6.8 to 7.8 and sodium fumarate, and incubating under agitation at a temperature of between 5 and 45° C. for at least one-half hour, the adrenal tissue being present in an amount equal to from one part of tissue to 1 to 5 parts by volume of buffer solution, 17α-hydroxyprogesterone being present in an amount approximately equal to one part of compound to 1000 parts of tissue, and the sodium fumarate being present in an amount equal to at least 2½ mols to each 200 parts by weight of the buffer solution.

4. A process for the production of 17α-hydroxycorticosterone comprising dissolving the corresponding 17α-hydroxyprogesterone in propylene glycol, adding the solution of 17α-hydroxyprogesterone to an incubation mixture of fresh, finely divided animal adrenal tissue in a physiological saline solution containing potassium and magnesium ions and a buffer capable of maintaining a pH of from 6.8 to 7.8 and sodium citrate, and incubating under agitation at a temperature of between 5 and 45° C. for at least one-half hour, the adrenal tissue being present in an amount equal to from one part of tissue to 1 to 5 parts by volume of buffer solution, the 17α-hydroxyprogesterone being present in an amount approximately equal to one part of compound to 1000 parts of tissue, and the sodium citrate being present in an amount equal to at least 2½ mols to each 200 parts by weight of the buffer solution.

ALEJANDRO ZAFFARONI.

References Cited in the file of this patent

UNITED STATES PATENTS

| Number | Name | Date |
| --- | --- | --- |
| 1,515,976 | Stern | Nov. 18, 1924 |

OTHER REFERENCES

Hechter et al.: J. A. C. S., Sept. 1949, pp. 3261–3262.

Hayano et al.: Proc. Soc. Exptl. Biol. and Med., Dec. 1949, pp. 700–701.

Hechter et al.: Arch. Bioch., vol. 25, No. 2, pp. 457–460, Feb. 1950.

McGinty et al.: Science, Oct. 27, 1950, vol. 112, No. 2913, p. 506.

Savard et al.: Endocrinology, Dec. 1950, vol. 47, No. 6, pp. 418–428.